United States Patent [19]

Osanai

[11] 4,430,677
[45] Feb. 7, 1984

[54] CASSETTE TAPE RECORDER

[75] Inventor: Akira Osanai, Tokyo, Japan

[73] Assignee: Olympus Optical Co., Ltd., Tokyo, Japan

[21] Appl. No.: 304,080

[22] Filed: Sep. 21, 1981

[30] Foreign Application Priority Data

Sep. 25, 1980 [JP] Japan ................. 55-133166

[51] Int. Cl.$^3$ ............................................. G11B 19/00
[52] U.S. Cl. ......................................... 360/966; 360/93
[58] Field of Search ................ 360/96.5, 96.6, 93, 360/137

[56] References Cited

U.S. PATENT DOCUMENTS 4,017,900  4/1977  Katsurayana ................. 360/96.6
4,344,097  8/1982  Takai ........................ 360/96.6 X Primary Examiner—John H. Wolff
Attorney, Agent, or Firm—Frishauf, Holtz, Goodman & Woodward

[57] ABSTRACT

A cassette tape recorder is provided with a kangaroo pocket type cassette holder. The cassette holder comprises a fitting member which is slidably mounted on a base board and is made to move in parallel with the base board, for example, by two guide pins, and a cassette holder body swingably attached to the fitting member. The fitting member is pushed together with the cassette holder body from a rising to a falling position against the urging force of the kick spring, and is suddenly brought to rest by a stopper while being shifted from a falling to a rising position by the accumulated urging force of the kick spring, thereby causing the cassette holder body to swing on the fitting member.

2 Claims, 20 Drawing Figures

FIG. I

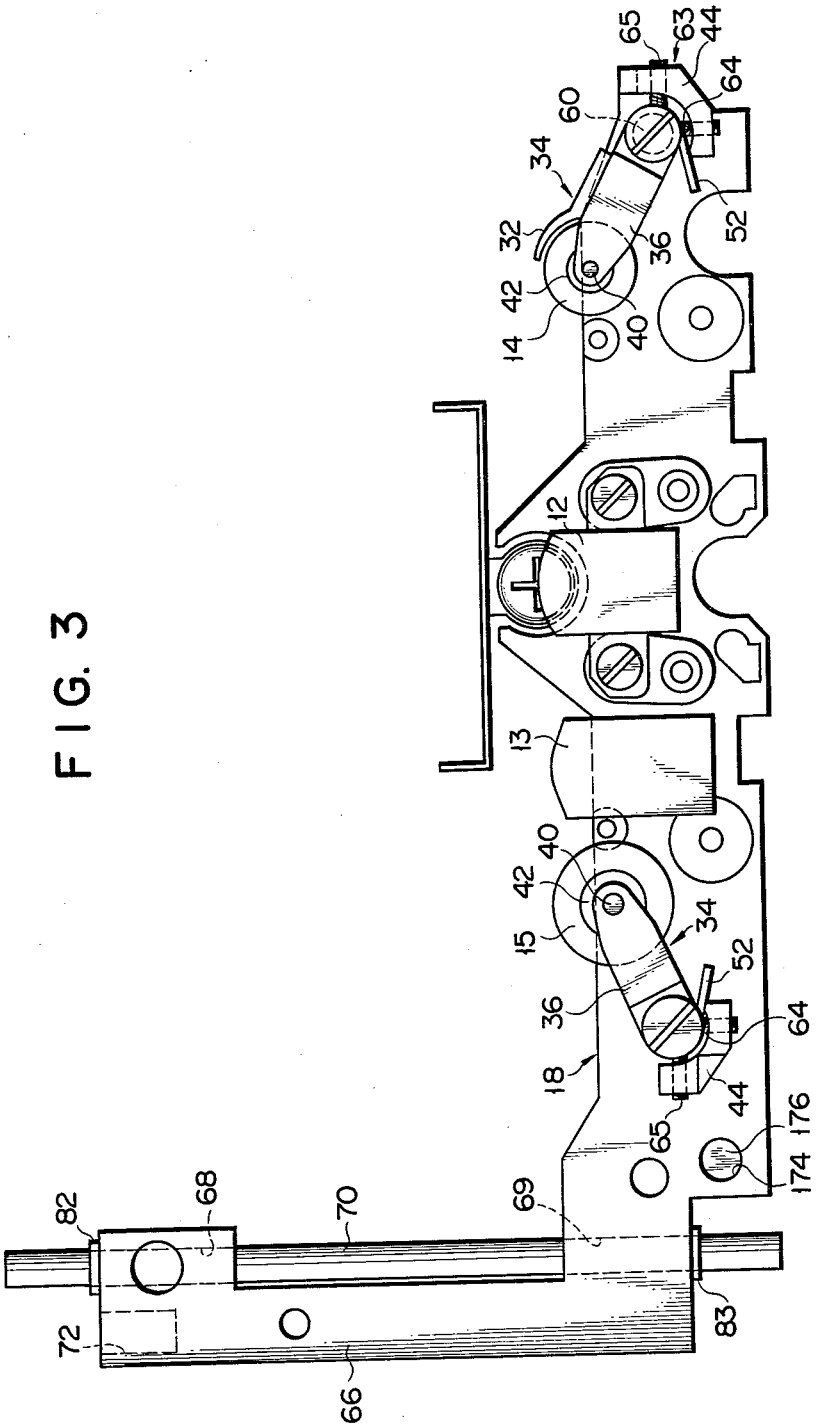

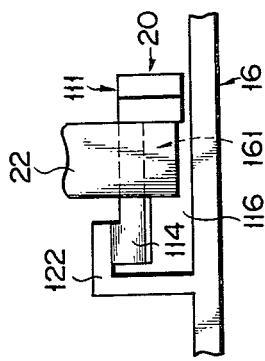
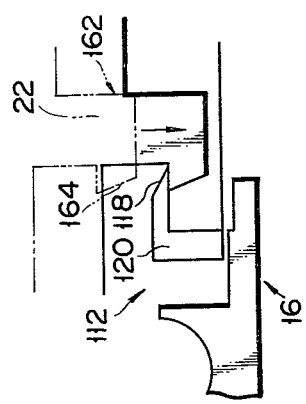
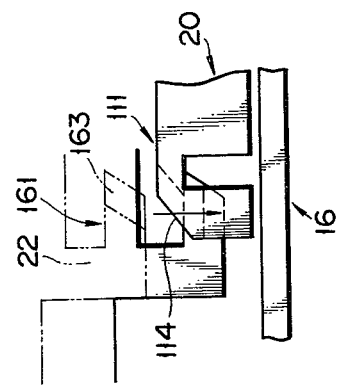
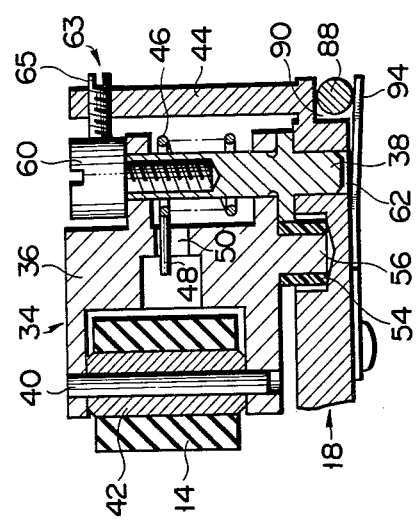
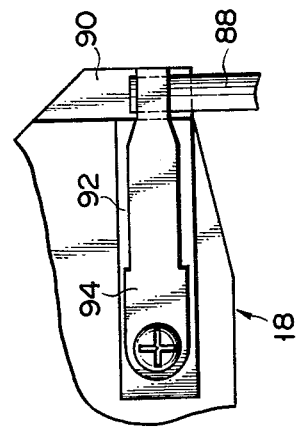

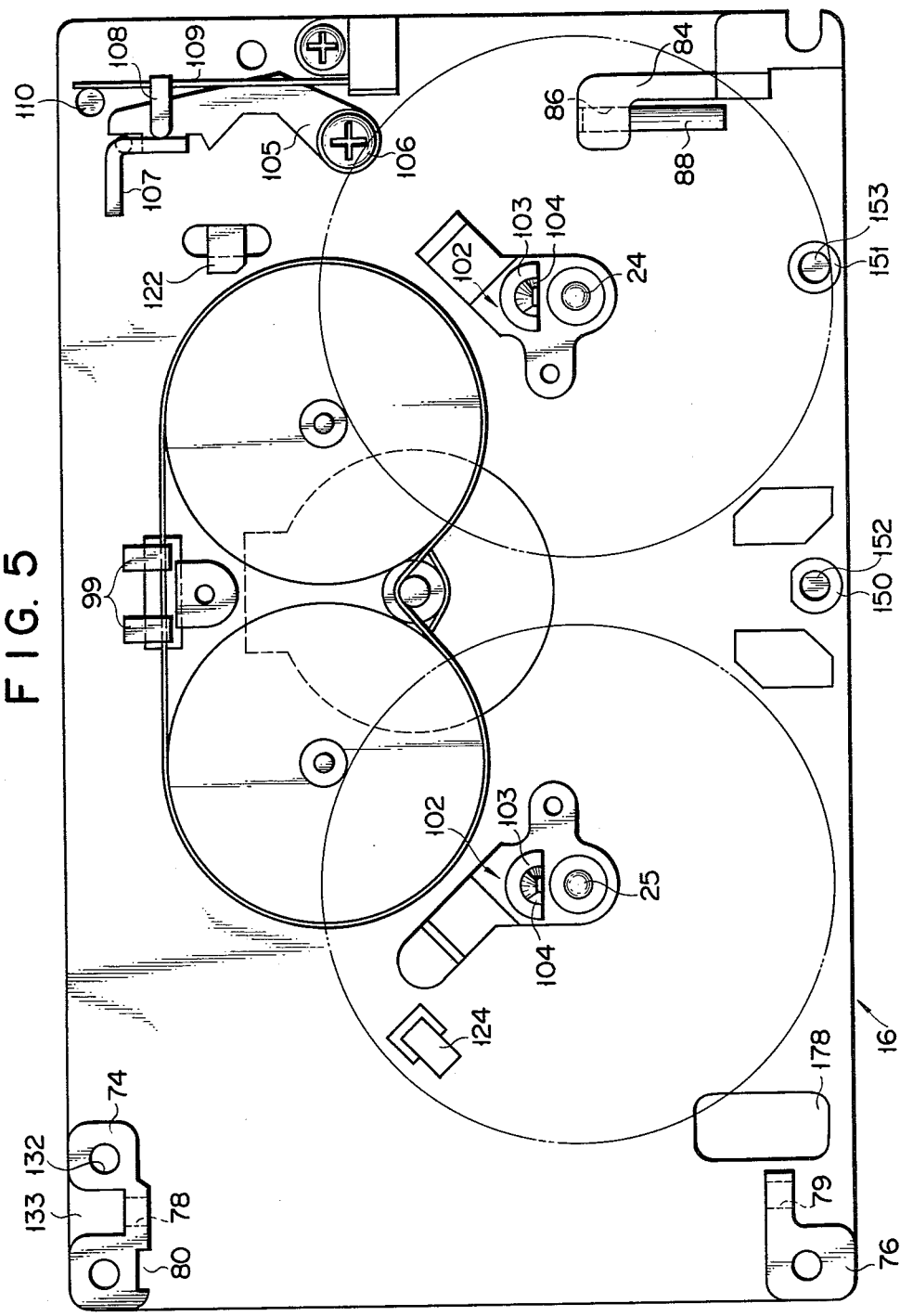

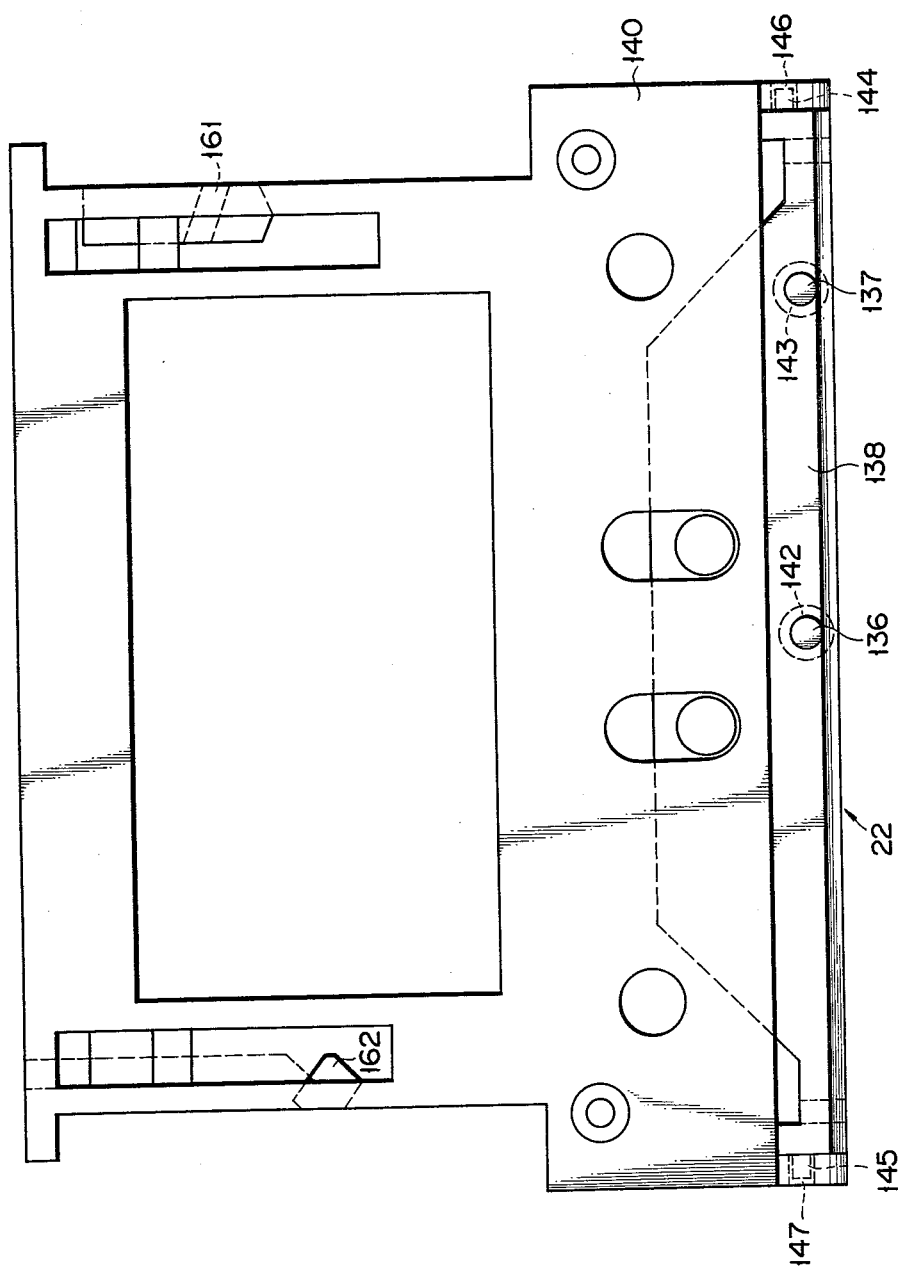

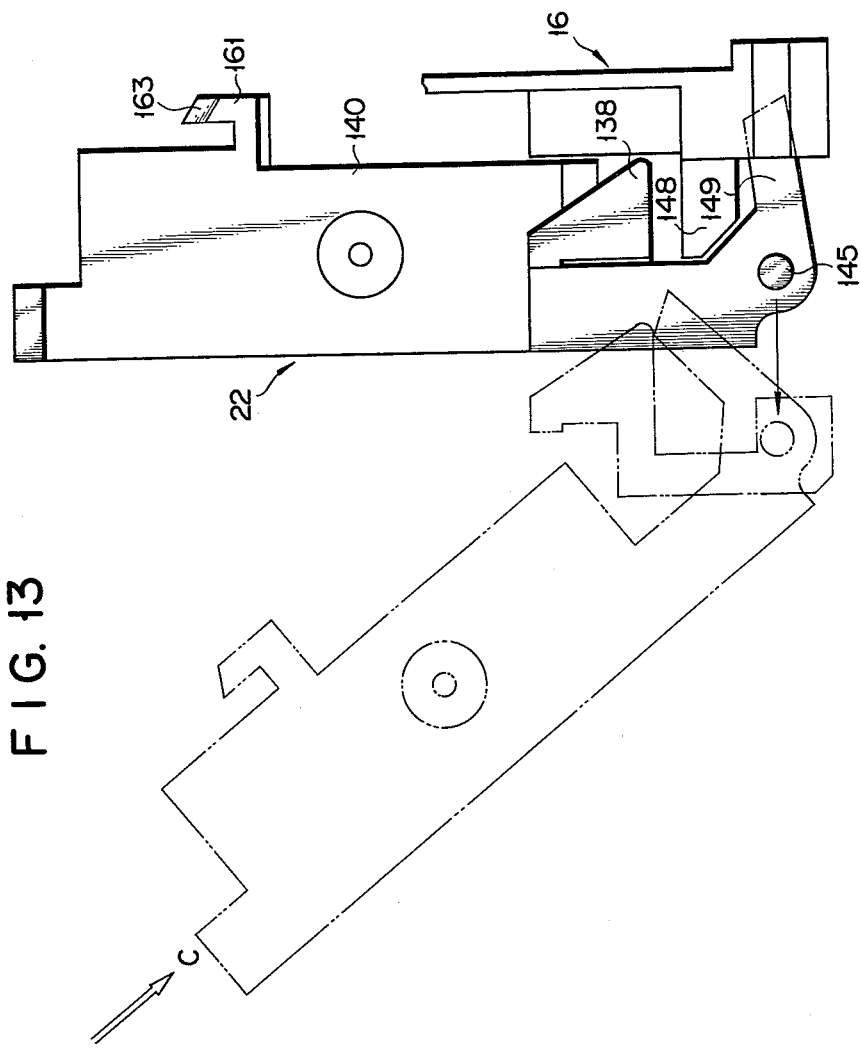

CASSETTE TAPE RECORDER

BACKGROUND OF THE INVENTION

This invention relates to a cassette tape recorder provided with a kangaroo pocket type cassette holder. A cassette holder used with the conventional cassette tape recorder of the above-mentioned type is hinged to a tape recorder body to be rotated by the hinged arrangement. A cassette-fitting opening is positioned outside of the cassette tape recorder. Another cassette tape recorder is also known wherein a cassette holder is made to project from the tape recorder body in parallel therewith in order to enable a cassette to be easily fitted into and removed from the tape recorder body. A cassette holder capable of the parallel movement is generally provided with a pantograph. A cassette holder is ejected to the outside by an urging force accumulated in the pantograph. The above-mentioned cassette holder movable parallel with the tape recorder body is generally sustained in the parallel position. With a cassette tape recorder used with a car stereophonic system, a cassette holder is made to swing in accordance with the magnitude of an impact applied thereto. To assure the smooth parallel movement of the cassette holder with the tape recorder body, it is necessary that the cassette holder be supplied with forces symmetrical with each other as viewed in the horizontal direction. Moreover, a tape recorder provided with a pair of pantographs tends to increase in volume and weight.

SUMMARY OF THE INVENTION

It is therefore the object of this invention to provide a cassette tape recorder in which the above-mentioned drawbacks are removed.

To attain this object, according to this invention a cassette tape recorder which is provided with a kangaroo pocket type cassette holder and wherein the cassette holder comprises a fitting member which is slidably mounted on a base board and is made to move in parallel with the base board, for example, by two guide pins, and a cassette holder body swingably attached to the fitting member. The fitting member is pushed together with the cassette holder body from a rising to a falling position against the urging force of the kick spring, and is suddenly brought to rest by the shopper while being shifted from a falling to a rising position by the accumulated urging force of the kick spring, thereby causing the cassette holder body to swing on the fitting member.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWING

FIG. 3 is a top plan view of a head lever of the cassette tape recorder;

FIG. 4 is a longitudinal sectional view on line IV—IV of FIG. 1 of a pinch roller support mechanism set on the head lever;

FIG. 5 is a schematic top plan view of the base board of the cassette tape recorder;

FIG. 6 is a fractional bottom plan view of the head lever, showing a plate spring;

FIGS. 7A to 7C are fractional longitudinal sectional views of the cassette tape recorder on lines VII A—VII A, VII B—VII B and VII C—VII C of FIG. 1, respectively;

FIG. 10 is a top plan view of the cassette holer;

FIG. 13 is illustrates the operation of the cassette holder when the cassette is ejected;

DETAILED DESCRIPTION OF THE PREFERRED EMBODIMENT

There will now be described by reference to the accompanying drawing of a cassette tape recorder according to this invention.

Figure 1:
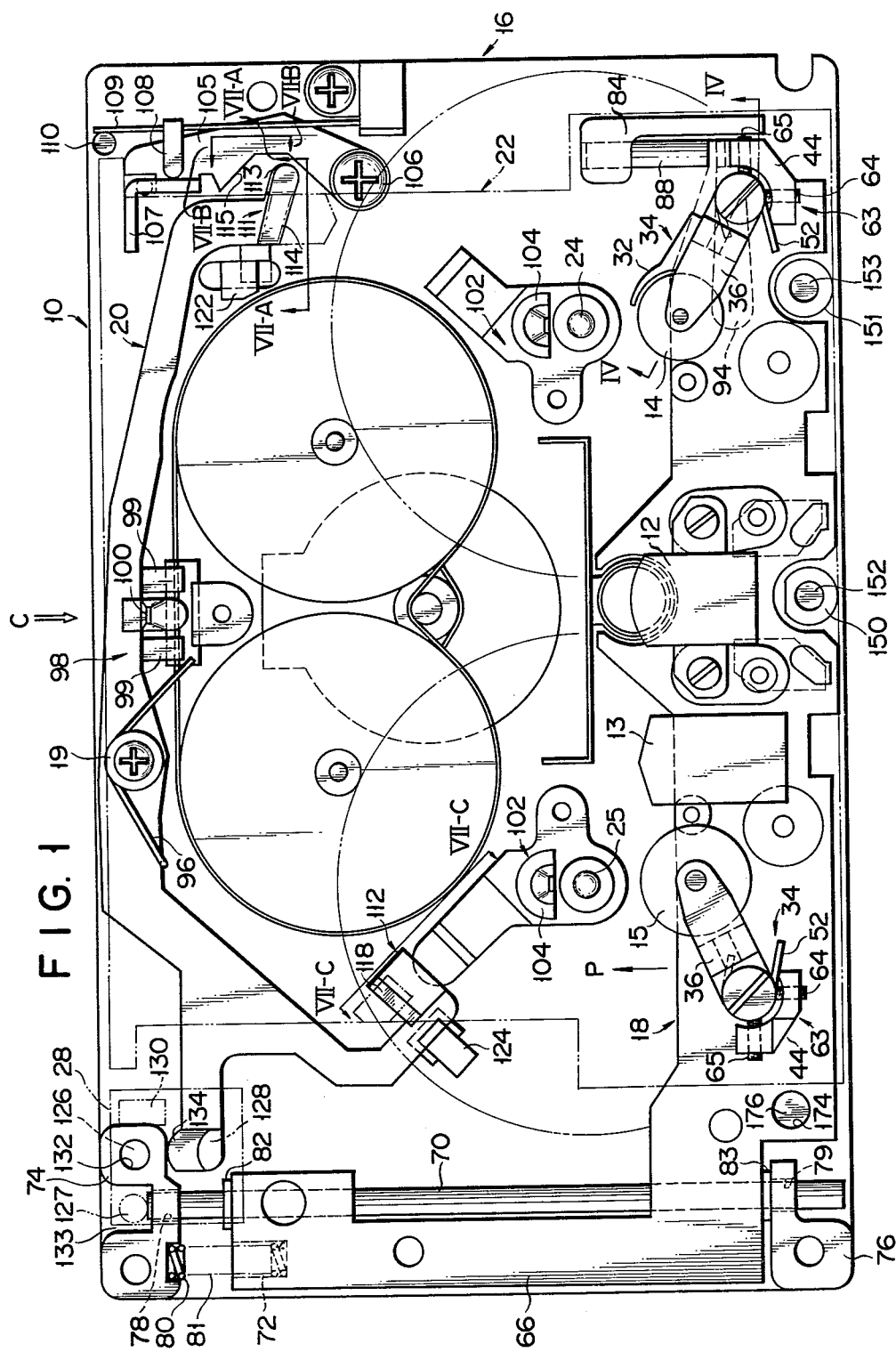
FIGS. 1 and 2 are schematic plan views of a cassette tape recorder embodying this invention at the stop mode and the play or record mode, respectively.
Figure 2:
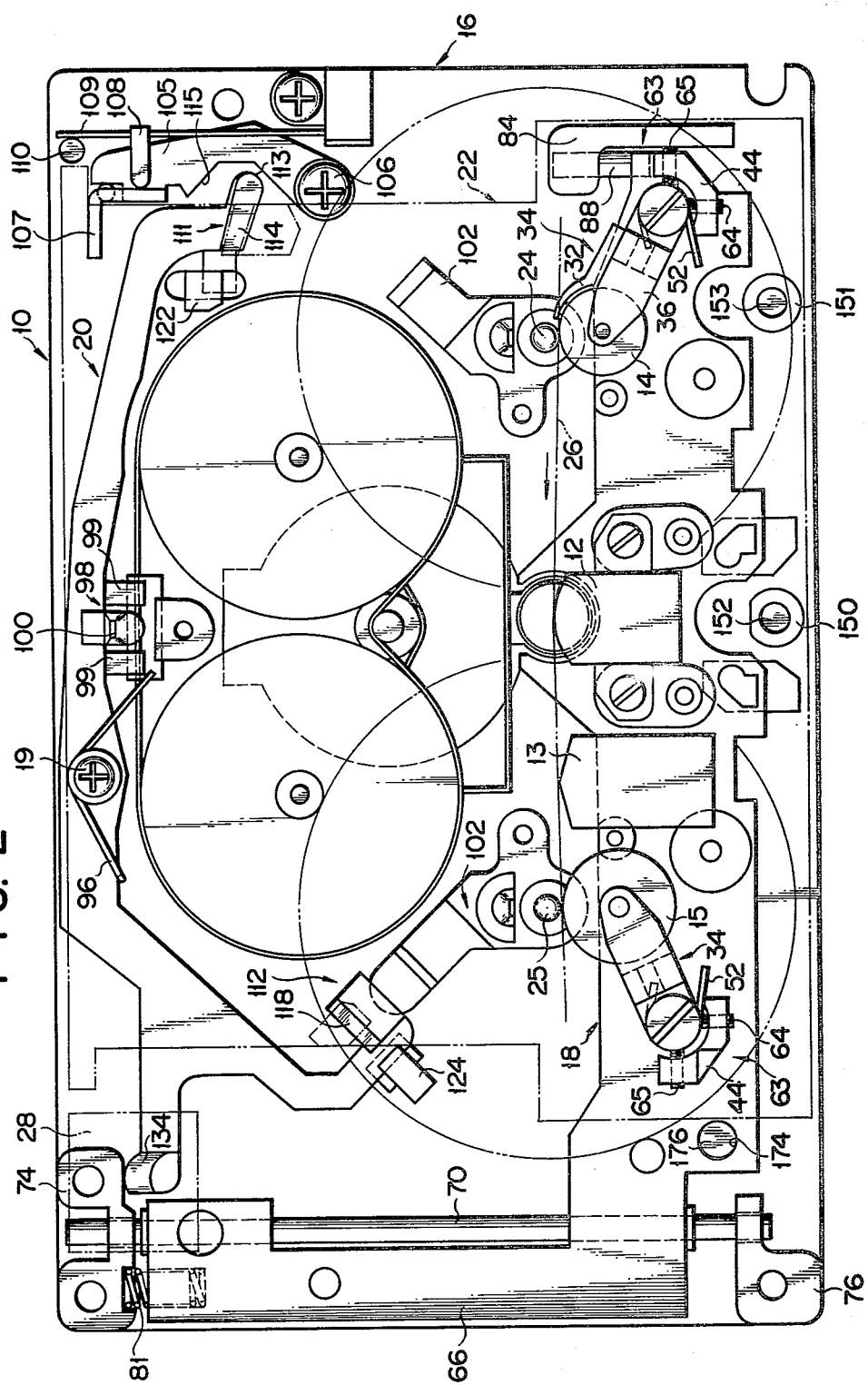

First, a brief description is given of the arrangement and operation of the cassette tape recorder 10. As shown in FIG. 1, a cassette tape recorder 10 comprises a head lever 18 slidably mounted on the base board 16 to support magnetic heads 12, 13 and pinch rollers 14, 15, and a cassette eject lever 20 rotatably mounted on the base board 16 by a pivotal pin 19. A swingable cassette holder 22 is mounted on the base board 16 in a state horizontally movable away from the base board. While kept in a lifted position, a cassette (not shown) is inserted into the cassette holder 22 in the direction of an indicated arrow C. Thereafter, the cassette holder 22 is pressed against the base board 16 and locked in a prescribed position by engagement with the cassette eject lever 20. Later, the cassette tape recorder is set at the play or record mode by letting the head lever 18 slide upward in the direction of an indicated arrow P and clamping a tape 26 between the pinch roller 14 and capstan shaft 24 and also between the pinch roller 15 and capstan shaft 25 (FIG. 2). At the play mode, the tape 26 runs in the direction of an arrow F indicated in FIG. 2. The cassette is ejected by depressing an eject button 28 toward the base board 16 and causing the eject lever 20 to swing counterclockwise about the pivotal pin 19. This swing of the eject lever 20 releases the cassette holder 22 from a position locked by the eject lever 20. As a result, the cassette holder 22 is kicked to commence a swing and shifted to a cassette ejecting position.

Detailed description is now given of the respective constituent members of the subject cassette tape recoder. Reference is first made to the head lever 18. As shown in FIG. 3, the head lever 18 supports the erase magnetic head 12 and recording-reproduction magnetic head 13 and also a pair of pinch rollers 14, 15. The pinch roller 14 set upstream as viewed from the running direction of the tape 26 (FIG. 2) is different from the downstream pinch roller 15 in that the upstream pinch roller 14 is provided with a tape guide 32 and has a smaller diameter than the downstream pinch roller 15. Since the upstream pinch roller 14 having a smaller diameter than the downstream pinch roller 15 is rotated at a lower circumferential speed than the latter, the running tape 26 is provided with a required tension. The upstream and downstream pinch rollers 14, 15 are supported by the corresponding pinch roller support mechanisms 34 having the same arrangement so that the inclination of the pinch rollers 14, 15 on a vertical plane can be adjusted. Description is now given of the arrangement of the pinch roller support mechanism 34 with reference to the upstream pinch roller 14. As seen from FIGS. 1, 3 and 4, particularly from FIG. 4, the pinch roller support mechanism 34 is provided with a fork-shaped support arm 36, which is rotatably held by a shaft 38 fixed to the head lever 18. A pinch roller shaft 40 is fixed to the support arm 36. The pinch roller 14 is rotatably supported by the pinch roller shaft 40 by means of a bearing 42. A screen-shaped upright wall 44 partly shielding the shaft 38 is erected from the head lever 18. A torsion coil spring 46 is wound about the shaft 38. One end 48 of the torsion coil spring 46 is inserted into a hole 50 of the support arm 36. The other end 52 of the torsion coil spring 46 is pressed against the end portion of the lateral side of the upright wall 44. The support arm 36 is so urged by the torsion coil spring 46 as to cause the pinch roller 14 to be rotated clockwise (FIG. 3) about the shaft 38. The support arm 36 comprises an integral downward extending projection 56 fitted with a shock-absorbing ring 54 prepared from, for example, polyvinyl chloride. The projection 56 is loosely inserted into a guide hole 58 formed in the head lever 18. Therefore, the support arm 36 is urged by the torsion coil spring 46, until the shock-absorbing ring 54 touches the lateral wall of the guide hole 58. Further, the support arm 36 can be rotated against the urging force of the torsion coil spring 46 in a space defined between the shock-absorbing ring 54 and guide hole 58. A screw 60 constituting part of the shaft 38 is threadedly engaged with the shaft, thereby adjusting the vertical movement of the support arm 36 relative to the shaft.

The pinch roller shaft 40 is demanded to be set parallel with the corresponding vertical capstan shaft 24 mounted on the base board 16. Otherwise, a tape clamped between the these shafts 24, 40 is displaced upward or downward along these shafts, failing to run properly. The capstan shaft 24 is mounted on the base board 16. The shaft 38 of the support arm 36 for the pinch roller shaft 40 is set on a different member, that is, a head lever sliding on the base board 16. Even where, therefore, a hole 62 into which the shaft 38 is forcefully inserted is rendered sufficiently vertical, the parallel relationship of the pinch roller shaft 40 with the capstan shaft 24 is not always assured. With the cassette tape recorder 10 of this invention, the shaft 38 is inclined beforehand toward the central portion of the upright wall 44. The inclination of the shaft 38 toward the upright wall 44 can be effected by various processes, for example, by inclining the shaft 38 forcefully inserted into the hole 62 by human work toward the upright wall 44 or forming the hole 62 itself in an inclined state. The shaft 38 thus inclined is pushed far away from the upright wall 44 by parallelism-adjusting means 63 which adjusts the inclination of the shaft 38 to assure the proper parallelism of the shaft 38 with the capstan shaft 24. The parallelism-adjusting means 63 can sufficiently serve the purpose, provided it has a function of pressing the shaft 38 against its inclination thereby to assure its parallelism with the pinch roller shaft 40. The parallelism-adjusting means 63 is provided with a pair of set screws 64, 65 which are threadedly engaged with the upright wall 44 and whose outer end is pressed against the lateral wall of the screw 60. The set screws 64, 65 are so positioned as to receive a component of a reaction force produced in the shaft 38 when it is pressed by the screw 60. The set screws 64, 65 adjusts the magnitude of a pressure impressed on the shaft 38, thereby assuring the parallelism of the pinch roller shaft 40. The parallelism adjusting means 63 provided with the above-mentioned set screws 64, 65 can easily and quickly assure the parallelism of the pinch roller shaft 40 by adjusting the extent to which the set screws 64, 65 are made to project. Further, the parallelism-adjusting means 63 allows for application of small pitch set screws, enabling the fine adjustment of the parallelism.

The sliding of the head lever 18 is effected by the undermentioned process. As shown in FIG. 3, the head lever 18 is provided at one end with an integral strip 66 extending first laterally of the head lever 18 and then at right angles thereto. A guide bar is forcefully inserted into a hole 68 formed in the extending integral strip 66 and a hole 69 formed in the head lever 18 itself. The guide bar 70 is set at right angles to the head lever 18. A spring-receiving blind hole 72 is formed at a free end of the extending strip 66. As schematically indicated in FIG. 5, two upright walls 74, 76 are respectively built on both left sides of the base board 16. Guide holes 78, 79 are respectively formed in the upright walls 74, 76. A depression 80 is formed in the upright wall 74. A return spring 81 (FIG. 1) such as a compression coil spring is provided between the depression 80 and the spring-receiving blind hole 72 of the head lever 18. This return spring 81 may be wound about the guide bar 70 instead of being set between the depression 80 and spring-receiving blind hole 72. As indicated in FIG. 1, both ends of the guide bar 70 are respectively loosely inserted into guide holes 78, 79, thereby enabling the guide bar 70 to slide along the surface of the base board 16. Reference numerals 82, 83 represent shock-absorbing plastics ring intended to suppress collision between the head lever 18 and upright walls 74, 76 and also to define the position of the head lever. An upright wall 84 (FIG. 5) is formed at the right downside corner of the base board 16. Another guide bar 88 (FIG. 5) is forcefully inserted into a hole 86 formed in the upright wall 84. As shown in FIGS. 4 and 6, the guide bar 88 extends through a cavity 90 formed at the right end of the bottom wall of the head lever 18. As better seen from FIG. 6, a free end of a plate spring 94 held in a depression 92 formed in the bottom wall of the head lever 18 is pressed against the guide bar 88 to urge it toward the base surface of the cavity 90. In other words, the other end portion of the head lever 18 is constructed in the fork form, one of whose arms is constituted by the plate spring 94. The guide bar 88 is held in the cavity 90 formed in the fork-shaped end portion of the head lever 18. Therefore, the head lever 18 is restricted in a vertical movement relative to the guide bar 88, but is made free to be moved in a horizontal direction. Namely, the head lever 18 has a certain latitude of sidewise movement.

As previously described, the head lever 18 is enabled to slide along the surface of the base board 16 by means of a pair of guide bars 70, 88. In this case, the head lever 18 is rigidly restricted in the vertical and horizontal movements relative to the guide bar 70, but is restricted only in the vertical movement relative to the guide bar 88, and is made free to be horizontally moved, namely, has a certain latitude of sidewise movement. Accordingly, the head lever 18 can smoothly slide along the surface of the base board 16 against the urging force of the return spring 81 without scratching the guide bars 70, 88 to a position (FIG. 2) for the play or record mode. With the above-mentioned arrangement, it is unnecessary to try to assure an exact parallelism between the guide bars 70, 88. Therefore, the head lever 18 can slide properly by a simple and inexpensive arrangement.

With the foregoing embodiment, the guide bar 70 is fixed to the head lever 18, and the guide bar 88 is fixed to the base board 16. However, this invention is not limited to such arrangement, but obviously both guide bars 70, 88 may be fixed to the head lever 18. In this case, the base board 16 should advisably be provided with a fork-shaped support section in order to hold the guide bar 88. Further, the plate spring 94 was made to constitute the lower arm of the fork-shaped end section. However, this arrangement need not be exclusively followed, but the plate spring 94 may constitute the upper arm of the fork-shaped end portion.

As previously described, the eject lever 20 is rotatably mounted on the base board 16 by means of the pivotal pin 19. As shown in FIG. 1, the torsion coil spring 96 is wound about the pivotal pin 19. One end of the torsion coil spring 96 is pressed against the lateral wall of the eject lever 20, and the other end of the torsion coil spring 96 is pressed against the lateral wall of a guide block 99 of a cassette guide 98. Therefore, the eject lever 20 is urged to rotate clockwise about the pivotal pin 19 by the torsion coil spring 96, and is locked in a prescribed position when the laternal wall of the eject lever 20 is pressed against the guide block 99.

The cassette guide 98 comprises a pair of guide blocks 99 erected from the base board 16 and a guide pin 100 which is formed on the lateral wall of the eject lever 20 with an inclined plane. As shown in FIG. 5, a pair of cassette guides 102 are mounted on the base board 16 in the proximity of the capstan shafts 24, 25. Each cassette guide 102 is integrally provided with a flange-shaped guide block 103 and a guide pin 104 having an inclined plane. In this case, the inclined plane of the guide pin 100 is so shaped as to press a cassette inward, that is, downward of FIG. 1. In contrast, the inclined plane of the guide pin 104 is so shaped as to press the cassette inward, that is, upward of FIG. 1. The cassette guides 98, 102 define the horizontal and vertical position of the cassette. When the bottom wall of the cassette is pressed against the flat planes of the guide blocks 99, 103, then the vertical movement of the cassette is defined. Where the guide pins 100, 104 are respectively inserted into the guide holes (not shown) of the cassette and the inclined planes of the guide pins 100, 104 are pressed against the lateral surfaces of the guide holes to push the cassette in a horizontal direction, then the horizontal position of the cassette is defined. In this case, the pair of guide pins 104 for defining the horizontal position of the cassette are set immovable, whereas the guide pin 100 for similarly defining the horizontal position of the cassette which is mounted on the rotatable eject lever 20 is made movable relative to the paired guide pins 104. As described above, all the three guide pins (the single guide pin 100, and paired guide pins 104) are not fixed, but the single guide pin 100, thereby making it possible to correct the positional displacement of the cassette in the cassette holder. With such arrangement, it is not always necessary to accurately determine the relative positions of the three guide pins 104, 100, allowing for the easy working of the cassette tape recorder.

As seen from FIG. 5, the erroneous erasure preventing lever 105 is rotatably mounted on the base plate 16 by means of the pivotal pin 106. The erroneous erasure preventing lever 105 is provided at its free end with an integrally formed feeler member 107. Which is made insertible into a hole (not shown) produced after the removal of an erroneous erasure preventing lug formed on a lateral wall of the cassette. The erroneous erasure preventing lever 105 undergoes an urging force of a switch 109 through a plastics pressing member 108. Where the feeler member 107 is inserted into the hole produced after the removal of the erroneous erasure preventing lug, then the switch 109 is pressed against a stopper 110 mounted on the base board 16. Under this condition, current for the erase head 12 escapes to the base board 16, and consequently the erase head 12 does not effectively function, thereby preventing erroneous erasure.

As seen from FIG. 1, the eject lever 20 is provided at both ends with a pair of lock members 111, 112 for locking a cassette holder 22. As shown in FIGS. 7A and 7B, the lock member 111 comprises an inclined plane 114 and a cavity 116. As indicated in FIG. 7C, the lock member 112 comprises an inclined plane 118 and a cavity 120. The lock member 111 concurrently acts as a cam member provided with a partially columnar cam 113 (FIG. 2) at the end. The cam 113 is made engageable with a cam surface 115 formed in the lateral wall of the erroneous erasure preventing lever 105. The eject lever 20 is prevented from floating above the base board 16 by vertically inverted L-shaped blocks 122, 124 mounted on the base board 16 (FIG. 7A). Description is later given of the manner in which the cassette holder 22 is locked by the eject lever 20.

Figure 8:
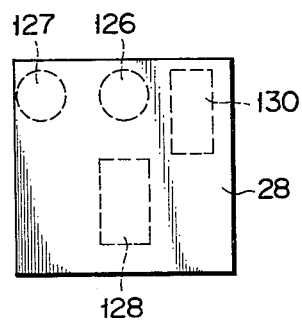
FIG. 8 is a top plan view of an eject button.
Figure 9:
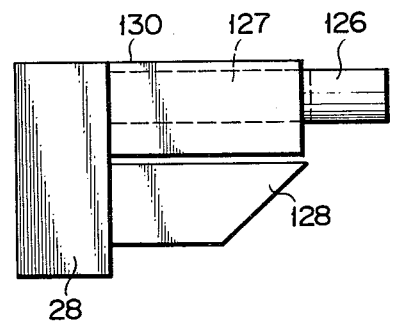
FIG. 9 is a right side view of the same.

As indicated in FIGS. 8 and 9, an eject button 28 for actuating the eject lever 20 is integrally provided with larger and smaller guide pins 126, 127, cam member 128 and rectangular guide 130. All these members extend from the bottom plane of the eject button 28. As shown in FIG. 1, the eject button 28 is mounted on the base board 16 such that the longer guide pin 126 is loosely inserted into a guide hole 132 formed in the upright wall 74 of the base board 16, and the shorter guide pin 127 is inserted into a cavity 133 formed in the upright wall 74. The eject lever 20 is provided with an inclined plane 134 (FIG. 1) to be contacted with the cam member 128 of the eject button 28. Where, therefore, the eject button 28 is depressed, then the cam member 128 abut on the inclined plane 134, causing the eject lever 20 to be rotated counterclockwise against the urging force of the torsion coil spring 96. As a result, the cassette holder 22 is released from a state locked by the eject lever 20. Further where the eject button 28 is depressed, then the guide pin 127 falls in front of the guide bar 70 to obstruct the travelling path of the guide bar 70, thereby preventing the malfunction of the cassette tape recorder, that is, the advance of the head lever 18 when the cassette is ejected. Where the eject button 28 is further depressed, then the rectangular guide 130 falls by being guided along the right lateral plane of the upright wall 74, thereby stopping the rotation of the eject button.

Figure 11:
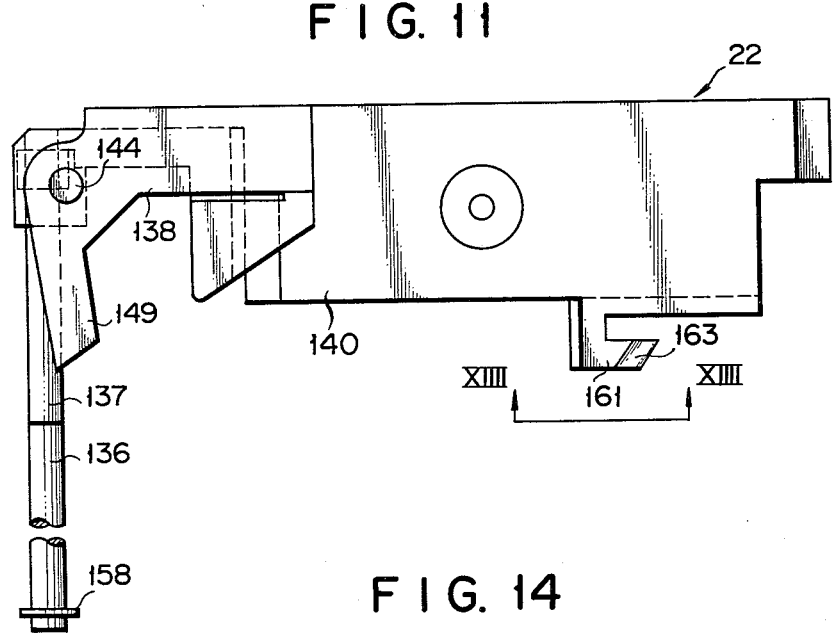
FIG. 11 is a right side view of the same.
Figure 14:
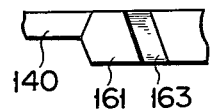
FIG. 14 is a fractional bottom plan view on line XIV—XIV of FIG. 11 of the cassette holder body.
Figure 12:
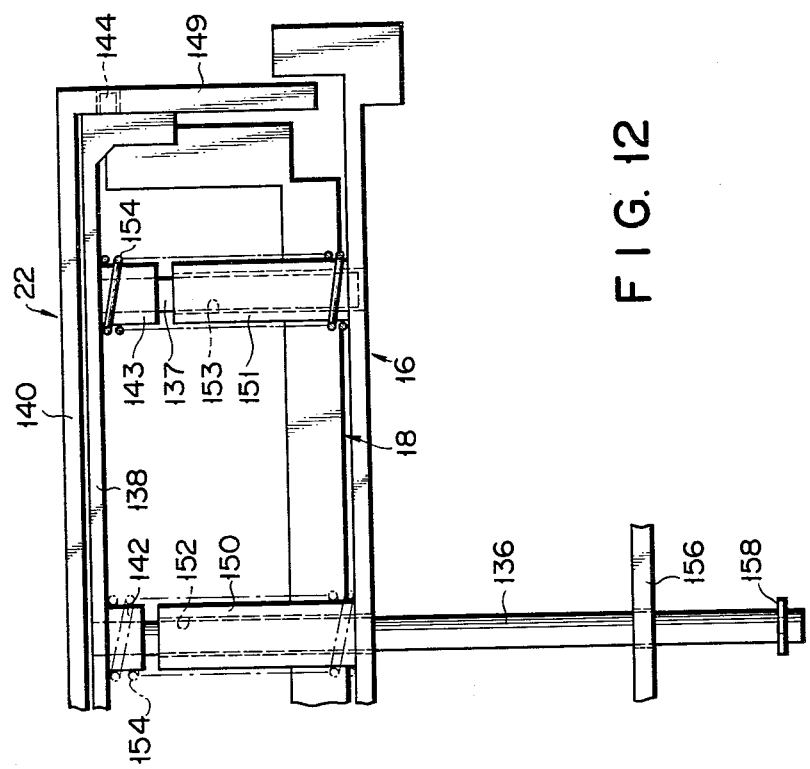
FIG. 12 is a fractional front view of the same.

As seen from FIGS. 10, 11 and 12, the cassette holder 22 comprises an aluminium fitting member 138 provided with longer and shorter guide bars 136, 137 and a platics cassette holder body 140 swingably fitted to the aluminium fitting member 138. The aluminium fitting member 138 is provided on the bottom wall with integrally formed sleeves 142, 143 for preventing the fall of the guide bars 136, 137 and at both ends with integrally formed pivotal pins 144, 145. Where the pivotal pins 144, 145 are respectively inserted into holes 146, 147, then the cassette holder body 140 is swingably fitted to the fitting member 138. Where the guide bars 136, 137 are respectively loosely inserted into guide holes 152, 153 (FIG. 5) formed in the cylindrical upright walls 150, 151 erected on the base board 16, then the fitting member 138 is mounted on the base board 16 in a state movable in parallel therewith. A kick spring 154 such as a compression coil spring is wound about the guide bar 137 through the sleeve 143 and cylindrical upright guide wall 151. However, the kick spring 154 may be wound about the guide bar 136 through the upright guide wall 150. The guide bar 136 extends through the guide hole 152 of the upright cylindrical guide wall 150 and also through a plunger fitting board 156 set below the base board 16. The free end of the guide bar 136 is fitted with a fall-preventing ring, for example, a snap ring 158. Where the cassette holder 22 is forcefully set in a position for the play or record mode, then the kick spring 154 is compressed to have its urging force fully accumulated in advance. Where, therefore, the cassette holder 22 is ejected, the kick spring 154 kicks the cassette holder 22 outward by the accumulated urging force. Where the snap ring 158 of the guide bar 136 is pressed against the plunger-fitting board 156 and the fitting member 138 suddenly stops, then the cassette holder body 140 swings about the pivotal pins 144, 145 by an inertial force, and is shifted to an eject position indicated by a two-dot chain line in FIG. 13. The snap ring 158 may be so positioned as to be pressed against the base board 16 instead of against the plunger-fitting board 156.

As shown in FIG. 13, a guide wall 148 having an inclined plane extends over the base board 16. Further, a projecting member 149 having an inclined plane is formed on the cassette holder body 140. When the inclined plane of the projecting member 149 slides along the inclined plane of the guide wall 148, then the cassette holder body 140 can smoothly swing. Where the cassette holder body 140 begins to swing, the other end of the projecting member 149 is positioned further back from the guide wall 148. Where, therefore, it is attempted to push the cassette holder body 140 in a swinging state without setting the cassette holder body 140 in parallel with the base board 16, then the projecting member 149 is pressed against the guide wall 148, thereby preventing the cassette holder 22 from being brought down and completely suppressing the malfunction of the cassette tape recorder.

The cassette holder body 140 is integrally provided with engagement members 161, 162 to be locked with the corresponding lock members 111, 112 of the eject lever 20. As seen from FIGS. 11, 14, 15 and 16, the engagement members 161, 162 are respectively provided with backward extending inclined planes 163, 164. Further as shown in FIGS. 1, 7A, 7B and 7C, the cassette holder body 140 is so positioned as to cause the inclined planes 163, 164 directed toward the lower part of the engaging members 161, 162 to face the inclined planes 114, 118 directed toward the upper part of the lock members 111, 112 of the eject lever 20. Where, therefore, after the insertion of the cassette into the cassette holder 22, the cassette holder is pushed backward to be set at the stop mode shown in FIG. 1, then the inclined planes 163, 164 of the engagement members 161, 162 are respectively moved in the directions shown by arrows in FIGS. 7B, 7C to be pressed against the inclined planes 114, 118 of the corresponding lock members 111, 112. The eject lever 20 is slightly rotated counterclockwise of FIG. 1 against the urging force of the torsion coil spring 96 due to a wedging action exerted by the mutually facing inclined planes. This rotation of the eject lever 20 causes the engagement members 161, 162 to be fitted into the cavities 116, 120 of the corresponding lock members 111, 112. Under this condition, the eject lever 20 is rotated clockwise by the urging force of the torsion coil spriing 96 to regain its original position, causing the lock members 111, 112 of the eject lever 20 to cover the upper parts of the engagement members 161, 162. The backward movement of the cassette holder 22 compresses the kick spring 154. Therefore, the engagement members 161, 162, though urged outward, are engaged with the overlying lock members 111, 112 to be locked in an unreleased position as indicated by solid lines in FIGS. 7B and 7C.

Figure 17:
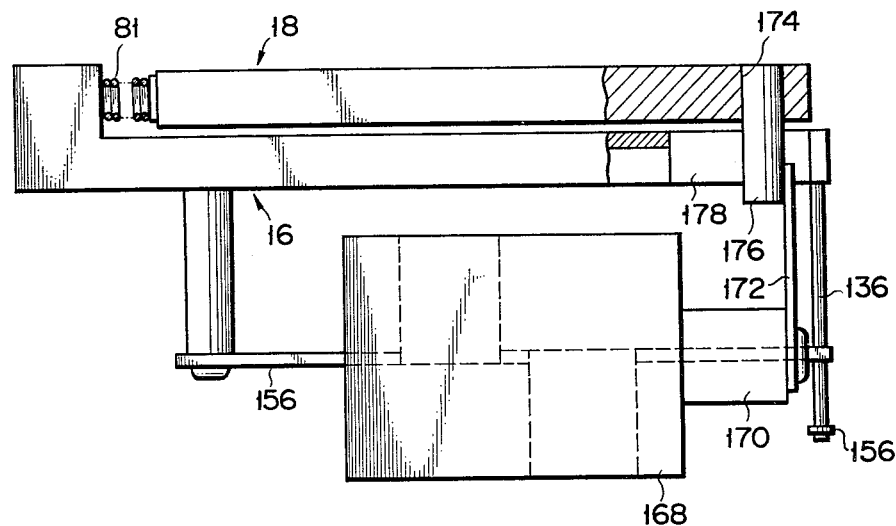
FIG. 17 is a schematic left side view of the cassette tape recorder.
Figure 15:
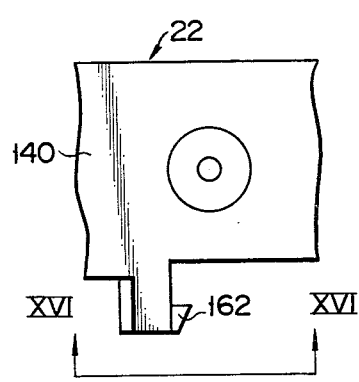
FIG. 15 is a fractional left side view of the cassette holder.
Figure 16:
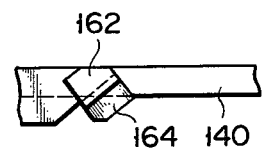
FIG. 16 is a fractional bottom plan view of the same on line XVI—XVI of FIG. 15.

Fixed to a fitting board 156 is a plunger mechanism 168 (FIG. 17), which comprises a plunger 170 to be lifted upward by an energized solenoid, and to the end of which a connection board 172 is bolted. The movement of the head lever 18 is controlled by the plunger mechanism 168. The head lever 18 is provided with a backward extending actuating rod 176 forcefully inserted into a hole 174. An elongate guide hole 178 for the actuating rod 176 is formed in the base board 16. The backward end of the connection board 172 is pressed against the peripheral surface of the actuating rod 176 on the outside thereof. Where the solenoid of the plunger mechanism 168 is energized to lift the plunger 170 upward, then the actuating rod 176 pushed by the connection board 172 is moved inward jointly with the plunger 170. The head lever 18 is shifted upward against the urging force of the return spring 81. As a result, the heads 12, 13 mounted on the head lever 18 are pressed against the tape 26 clamped between the capstan shafts 24, 25 for the play or record mode.

Figure 18:
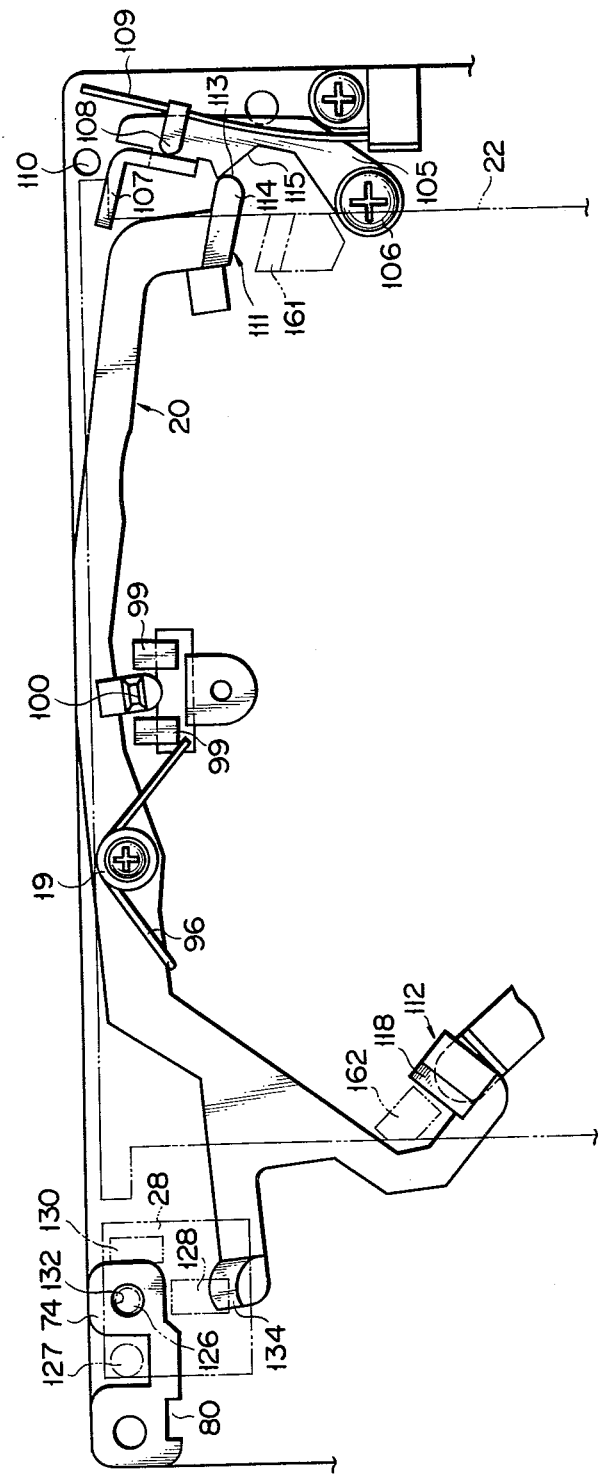
FIG. 18 is a schematic fractional top plan view of the cassette tape recorder when the cassette is ejected.

The indicated cassette tape recorder 10 embodying this invention is applied in the following manner. A cassette held in an eject position indicated by the two-dot chain line given in FIG. 13 is inserted into the cassette holder 22 in the direction of an indicated arrow C with the cassette opening directed downward. Thereafter, the cassette holder body 140 is made to swing to occupy a position parallel with the base board 16. Later, the cassette is pushed toward the base board 16 against the urging force of the kick spring 154 (FIG. 12). Where the cassette holder 22 is pushed, as seen from FIGS. 7A, 7B and 7C the engagement members 161, 162 of the cassette holder 22 are locked by the lock members 111, 112 of the eject lever 20 for a stop mode shown in FIG. 1. Where the solenoid of the plunger mechanism 168 is energized after the locking of the cassette holder 22, then the plunger 170 (FIG. 17), causing the head lever 18 to be moved in the direction of the arrow P given in FIG. 1 while being guided by the guide bars 70, 88. The tape 26 is clamped between the pinch rollers 14, 15 as well as between the capstan shafts 24, 25 for a play or record mode (FIG. 2). Where a tape end is reached, the solenoid is deenergized, and the head lever 18 regains a position for a stop mode (FIG. 1) by the urging force of the return spring 81 which has been sufficiently compressed up to this point. Where the eject button 28 is pushed after th stop mode is set, then the cam member 128 of the eject button 28 contacts the inclined plane 134 of the eject lever 20. The eject lever 20 is rotated counterclockwise of FIG. 18 about the pivotal pin 19 by the wedge action jointly exerted by the cam member 128 and inclined plane 134. The counterclockwise rotation of the eject lever 20 causes the lock members 111, 112 of the eject lever 20 to be shifted sidewise from the lock position in which they cover the upper portions of the engagement members 161, 162 of the cassette holder 22 to release it from a locked state. Where, at this time, the feeler member 107 of the erroneous erasure preventing lever 105 is not inserted into a hole produced after the removal of the erroneous erasure preventing lug, then the cassette holder 22 is moved in parallel with the base board 16 by the urging force of the kick spring 154, while being guided by the guide bars 136, 137. At this time, the snap ring 158 is pressed against the immovable plunger fitting board 156 (FIG. 12), causing the fitting member 138 of the cassette holder 22 to be instantly brought to rest. Under this condition, the cassette holder body 140 begins to swing on the fitting member 138 due to the inertial force, thereby occupying a eject position indicated by the two-dot chain line given in FIG. 13 to be finally ejected.

If, at the ejection of the cassette, the feeler member 107 of the erroneous erasure preventing lever 105 is inserted into a hole produced after the removal of the erroneous erasure preventing lug, then the feeler member 107 is released from the hole by the rotation of the eject lever 20 caused by the depression of the eject button 28. Where the eject lever 20 is rotated counterclockwise about the pivotal pin 19, then the cam 113 of the lock member 11 of the eject lever 20 is pressed against the cam surface 115 of the erroneous erasure preventing lever 105, causing this lever to be rotated clockwise of FIG. 18 about the pivotal pin 106. This clockwise rotation of the erroneous erasure preventing lever 105 disengages the feeler member 107 from a hole produced by the removal of the erroneous erasure preventing lug, thereby enabling the ejection of the cassette.

As above-mentioned according to this invention, the eject lever 20 is integrally provided with the guide pin 100 for defining the horizontal position of the cassette, lock members 111, 112 for locking the cassette holder 22 by engagement therewith, and the cam member 113 for causing the erroneous erasure preventing lever 105 to be rotated, thereby eliminating the obstruction of the cassette ejection caused by the lever 105. Therefore, the cassette is ejected easily and quickly by simple arrangement. However, the eject lever 20 need not be always provided with the above-mentioned three kinds of members. Provision of only two of the three kinds of members can serve substantially the same object, as when three kinds thereof are used.

A kangaroo pocket type cassette holder of a cassette tape recorder according to this invention comprises a fitting member provided with an immovable guide bar and a cassette holder body swingably attached to the fitting member. The guide bar is slidably mounted on a base board, thereby enabling the cassette holder to move in parallel with the base board. A kick spring is also provided which accumulates an urging force, when the cassette holder is set in a prescribed position. When ejected, the cassette holder is moved outward from its loaded position in parallel with the tape recorder body. The cassette holder-fitting member is immediately brought to rest. At this time, the cassette holder body is made to swing on the fitting member by an inertial force. With the above-mentioned arrangement, the cassette holder can reliably slide by means of the guide bar, and the previously accumulated urging force of the kick spring assures the movement of the cassette holder in parallel with the tape recorder body. Therefore, the mechanism for assuring the parallel movement of the cassette holder is simplified, making it possible to decrease the size and weight of a cassette tape recorder. Further, where the cassette holder-fitting member is suddenly brought to rest, then the cassette holder itself begins to swing automatically due to its inertial force, thereby extremely simiplifying an arrangement assuring the swing.

It is not always necessary to provided one guide bar at the center of the cassette holder and another guide bar on either side thereof as indicated. Instead, it is possible to set two guide bars in mutually symmetrical relationship as viewed in the lateral direction of the cassette holder, or provide only one or three or more guide bars at suitable spots on the cassette holder. Further the guide bar need not have a circular cross sectional shape, but can have an unrounded cross sectional shape. Application of a guide bar having an unrounded cross sectional shape easily assures the movement of the cassette holder accurately parallel with the tape recorder body.

What is claimed is:

1. A cassette tape recorder provided with a Kangaroo pocket type cassette holder movably mounted on an immovable board so as to move between a first position and a second position wherein the cassette holder is farther from the immovable board than the first position, characterized in that the cassette holder comprises:
at least one guide pin slidably supported on the immovable board so as to be slidable in a cross direction relative to the immovable board;
a fitting member fixed to the guide pin so as to be movable between first and second positions respectively corresponding to the first and second positions of the cassette holder, the fitting member maintaining a parallel relationship to the immovable board at said first and second positions of the fitting member;
a cassette holder body detachably holding a tape cassette and swingably connected to the fitting member so as to be swingable between a first position wherein the cassette holder body is parallel to the immovable board and a second position wherein the cassette holder body is inclined to the immovable board;
kick spring means which accumulates an urging force for urging the fitting member toward the second position thereof when the fitting member moves from the second position thereof to the first position thereof; and
stop means for suddenly stopping the sliding movement of the guide pin at the second position of the fitting member when the fitting member moves from its first position to its second position, thereby causing the cassette holder body to swing from its first position to its second position.

2. The cassette tape recorder according to claim 1, wherein said kick spring means comprises a compression coil spring wound about said guide pin between the fitting member and the immovable member; and said stop means comprises a snap ring fixed to said guide bar so as to be pressed against said immovable member.

* * * * *

UNITED STATES PATENT AND TRADEMARK OFFICE
CERTIFICATE OF CORRECTION

PATENT NO. : 4,430,677

DATED : February 7, 1984

INVENTOR(S) : Akira OSANAI

It is certified that error appears in the above-identified patent and that said Letters Patent is hereby corrected as shown below:

COLUMN 5, line 52, after "and vertical" change "position" to

--positions--;

COLUMN 5, line 55, after "the vertical" change "movement" to

--position--;

COLUMN 8, line 63, after "(Fig. 17)" insert --moves upward--.

Signed and Sealed this

Eighteenth Day of September 1984

[SEAL]

Attest:

GERALD J. MOSSINGHOFF

Attesting Officer  Commissioner of Patents and Trademarks